(12) United States Patent
Davis et al.

(10) Patent No.: US 6,373,517 B1
(45) Date of Patent: Apr. 16, 2002

(54) SYSTEM AND METHOD FOR DISTRIBUTION OF ENCODED VIDEO DATA

(75) Inventors: Oran Davis, Sunnyvale; Bryan R. Martin, Campbell, both of CA (US)

(73) Assignee: 8x8, Inc., Santa Clara, CA (US)

(*) Notice: Subject to any disclaimer, the term of this patent is extended or adjusted under 35 U.S.C. 154(b) by 0 days.

(21) Appl. No.: 09/547,528

(22) Filed: Apr. 12, 2000

Related U.S. Application Data

(63) Continuation of application No. 08/980,915, filed on Dec. 1, 1997, now Pat. No. 6,078,350, which is a continuation-in-part of application No. 08/908,826, filed on Aug. 8, 1997, now Pat. No. 5,790,712, which is a continuation of application No. 08/658,917, filed on May 31, 1996, now abandoned, which is a continuation of application No. 08/303,973, filed on Sep. 9, 1994, now abandoned, which is a continuation of application No. 07/838,382, filed on Feb. 19, 1992, now Pat. No. 5,379,351.

(51) Int. Cl.⁷ .................................................. H04N 7/14
(52) U.S. Cl. ............................. 348/14.08; 348/14.09; 379/93.21
(58) Field of Search .................... 348/14.01, 14.02, 348/14.03, 14.04, 14.05, 14.06, 14.08, 14.09, 14.11, 14.12, 14.13; 379/93.21, 202.01; 370/260, 261; H04N 7/14

(56) References Cited

U.S. PATENT DOCUMENTS

| 5,379,351 A | | 1/1995 | Fandrianto et al. |
| 5,392,284 A | * | 2/1995 | Sugiyama ............ 348/14.01 |
| 5,644,355 A | | 7/1997 | Koz et al. |
| 5,675,375 A | | 10/1997 | Riffee |

FOREIGN PATENT DOCUMENTS

| JP | 403244279 A | * 10/1991 | ............ H04N/7/14 |
| JP | 07-212731 | 3/1999 | |

* cited by examiner

Primary Examiner—Duc Nguyen
Assistant Examiner—Melur Ramakrishnaiah

(57) ABSTRACT

A video conferencing arrangement that includes paired and configurable one-way translators. Each one-way translator is configurable to translate encoded video data from a first format to a second format, and are inter-coupled with a switch arrangement. Because each translator is configurable, a one-way translator can translate encoded video data from one of various formats to another format. Because each translator only translates from a first format to a second format, and not from the second format to the first format, conventional hardware and software can be used to save costs.

2 Claims, 5 Drawing Sheets

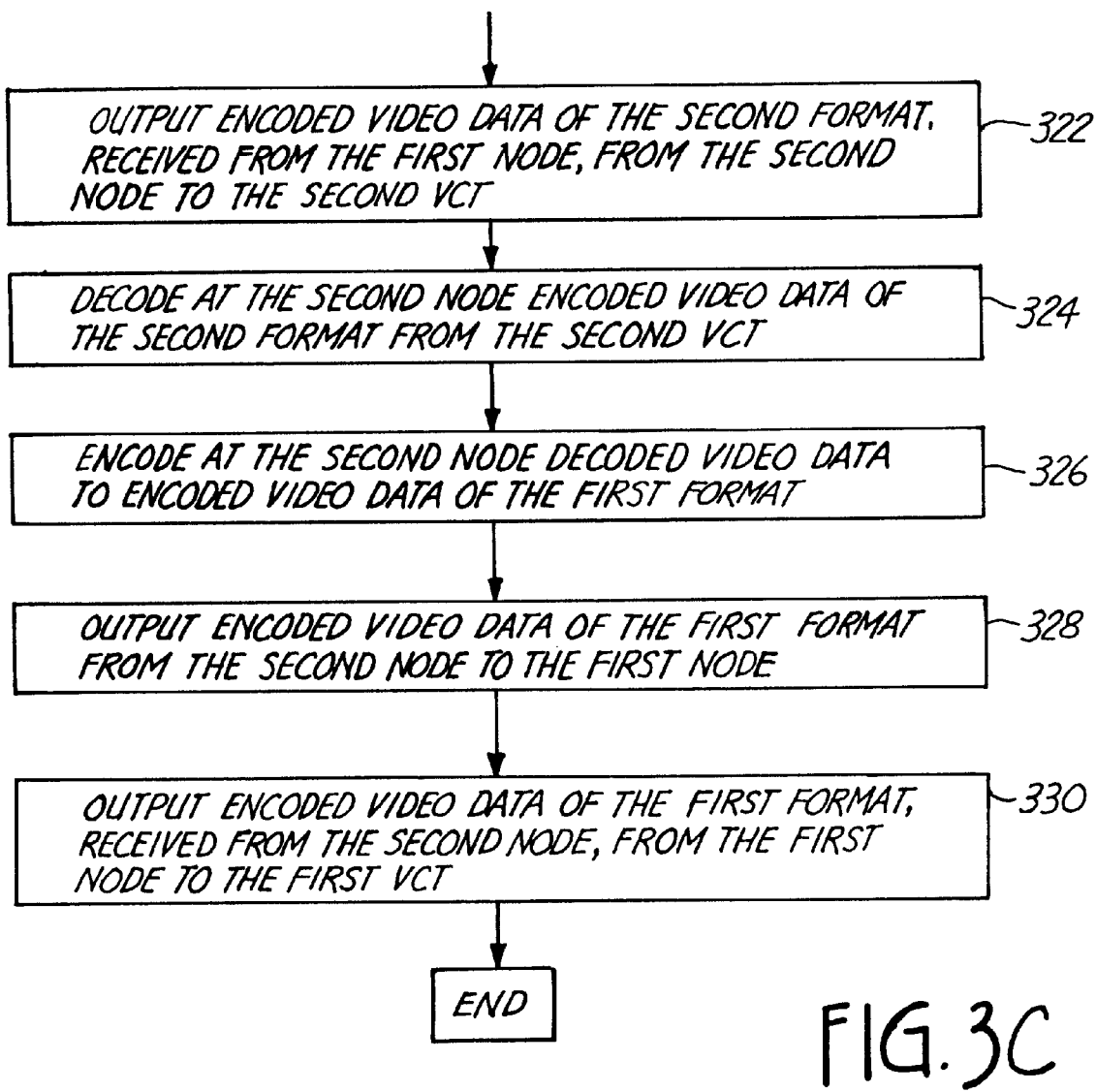

SYSTEM AND METHOD FOR DISTRIBUTION OF ENCODED VIDEO DATA

This is a continuation application of Ser. No. 08/980,915, filed on Dec. 1, 1997 U.S. Pat. No. 6,078,350, which is a continuation-in-part of Ser. No. 08/908,826, filed on Aug. 8, 1997 (now U.S. Pat. No. 5,790,712), which is a continuation of Ser. No. 08/658,917, filed on May 31, 1996 (now abandoned), which is a continuation of Ser. No. 08/303,973, filed on Sep. 9, 1994 (now abandoned), which is a continuation of Ser. No. 07/838,382, filed Feb. 19, 1992 (now U.S. Pat. No. 5,379,351).

FIELD OF THE INVENTION

The present invention relates to communication systems, and, more particularly, to transmission of encoded video data between devices that are compatible with different encoding standards.

BACKGROUND

An increasing number of communication applications are realizing the benefits of video-conferencing equipment. Such equipment generally includes two or more communication terminals participating in the transmission and/or reception of data representing captured video images, typically along with signals representing speech. One type of conventional video-conferencing arrangement includes at least one communication terminal set up with a camera, an image processor, and a transmission device transmitting captured video images for display at the other terminal(s).

While the benefits of video-conferencing equipment are widely recognized, extensive use of video-conferencing equipment has been inhibited largely due to cost, convenience and video quality. Compatibility between video-conferencing equipment is an example factor that impacts cost. Compatibility in this context is relative to a format for encoding and decoding data, for example video data.

There are various formats known in the art for encoding and decoding video data. A problem arises where video conferencing devices at different sites are compatible with different formats. Without some mechanism for translating video data between the different formats, a video conference cannot take place. While it would be desirable to have either all video conferencing equipment adhere to a single format or have video conferencing equipment that can interpret multiple formats, such solutions are not feasible. Such solutions are not feasible given different expectations for cost, convenience, and quality.

SUMMARY

According to one embodiment, the present invention is directed to a method and arrangement for video conferencing. One aspect of the invention is directed to a system for transmitting encoded video data between a first video conferencing terminal and a second video conferencing terminal, the first video conferencing terminal compatible with a first format of encoded video data, and the second video conferencing terminal compatible with a second format of encoded video data, comprising: a first node configured and arranged to couple to the first video conferencing terminal and including a first decoder configured and arranged to receive encoded video data of the first format from the first video conferencing terminal and decode the video data; and a first encoder coupled to the first decoder and configured and arranged to receive decoded video data from the decoder and encode the decoded video data in the second format; the arrangement further comprising a second node configured and arranged to couple to the second video conferencing terminal and including a second decoder configured and arranged to receive encoded video data of the second format from the second video conferencing terminal and decode the video data; and a second encoder coupled to the second decoder and configured and arranged to receive decoded video data from the decoder and encode the decoded video data in the first format; and the arrangement lastly comprising a switch circuit arrangement coupled to the first node and coupled to the second node, wherein the first node is arranged to provide encoded video data of the first format from the second node to the first video conferencing terminal, and the second node is arranged to provide encoded video data of the second format from the first node to the second video conferencing terminal.

BRIEF DESCRIPTION OF THE DRAWINGS

Other aspects and advantages of the present invention will become apparent upon reading the following Detailed Description and upon reference to the drawing in which:

FIGS. 3A, 3B, and 3C contain a flowchart of an example method operating in accordance with the present invention.

Figure 1:
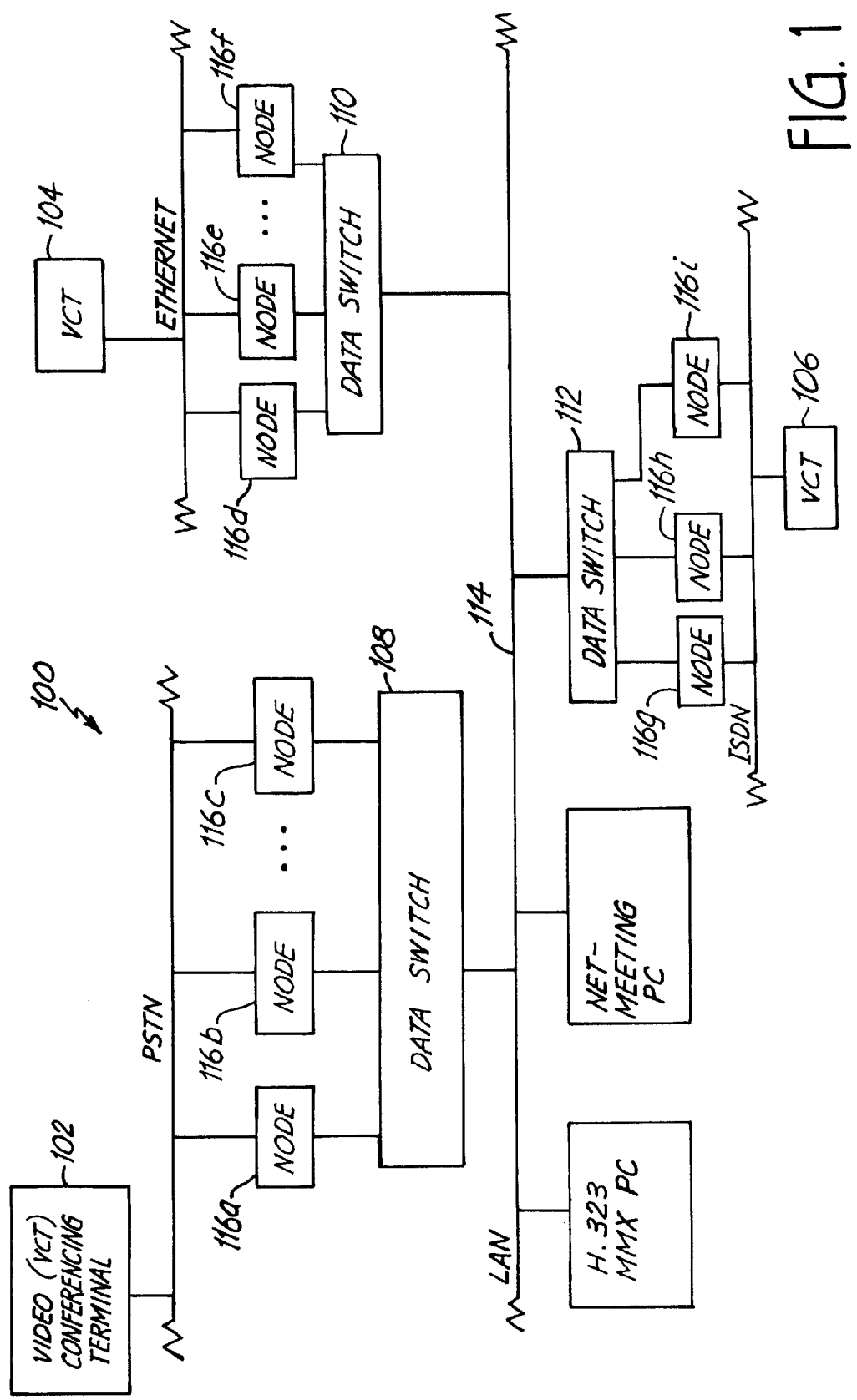
FIG. 1 is a functional block diagram of an example system according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of systems and arrangements that communicate video and other types of signals. The invention has been found to be particularly advantageous in application environments in which video conferencing terminals, which are compatible with different standards of encoded video data, communicate one with another. An appreciation of various aspects of the invention is best gained through a discussion of various application examples operating in such environments.

FIG. 1 is a functional block diagram of an example system according to the present invention. System 100 includes video conferencing terminals 102, 104, and 106. Video conferencing terminal 102 is compatible with example format A for encoding video data, and the video conferencing terminal 106 is compatible with example format B for encoding video data, wherein formats A and B are conventional standards-based formats. For example, terminal 102 may be a VC55 POTS ViaTV phone, and terminal 106 may be a VC130 ISDN ViaTV phone, both commercially available from 8×8, Inc. Video conferencing terminals 102 and 106 communicate via a communications channel that includes, for example, a PSTN, a LAN, and an ISDN. Those skilled in the art will recognize that various combinations of different types of communications channels, such as those in the example as well as others, may be used to couple video conferencing terminals.

Because video conferencing terminal 102 and video conferencing terminal 106 are compatible with different video encoding formats, translators are required to convert the encoded video data from one format to another. For example, for video conferencing terminal 102 to properly display data received from video conferencing terminal 106, a translator is required to convert encoded video data of format B to encoded video data of format A. Similarly, for video conferencing terminal B to properly display encoded video data received from video conferencing terminal A, a translator is required to convert encoded video data of format A to encoded video data of format B.

Data switches 108, 110, and 112 are coupled to LAN 114 and direct encoded video data between video conferencing terminals 102, 104, and 106. In an example embodiment, data switches 108, 110, and 112 are conventional personal computers having conventional network interface hardware and software for coupling to LAN 114. Data switches 108–112 are also coupled to translator nodes 116a–i.

Each of nodes 116a–i performs a one-way translation on behalf of a terminal involved in a video conference. Thus, for a video conference between two terminals that are compatible with different video encoding formats, 102 and 106, for example, two nodes are required. Assuming that nodes 116a and 116h are assigned translate for terminals 102 and 106, and terminal 102 is compatible with format A and terminal 106 is compatible with format B, data switch 108 configures node 116a to translate video data output from terminal 102 from format A to format B, and data switch 112 configures node 116h to translate video data output from terminal 106 from format B to format A. Note that node 116a does not translate encoded video data it receives from data switch 108 for input to terminal 102, and node 116h does not translate encoded video data it receives from data switch 112 for input to terminal 106. Nodes 116a and 116h do not need to translate encoded video data input to the respective terminals 102 and 106 because the encoded video data is already in the proper format by virtue of one node performing the conversion for the other.

In some applications, a pair of nodes, each providing only one-way translation, is advantageous over a single node performing two-way translation. A node having one-way translation capabilities may be advantageous because inexpensive hardware may be used run software that performs one-way translation, wherein the hardware and software achieve a desired performance level. In contrast, a single node that performs two-way translation may require extra processing power or extra hardware to achieve the same performance level as a pair of one-way translation nodes.

Video conferencing terminals 102, 104, and 106 are conventional, and may include personal computers along with supporting hardware and software, or, for example, the Modular Videophone with Web Browser which is commercially available from 8×8, Inc. Example video conferencing terminals shown in FIG. 1 include an H.323 standards-based personal computer with an MMX™ processor or a personal computer with NetMeeting™ software.

Figure 2:
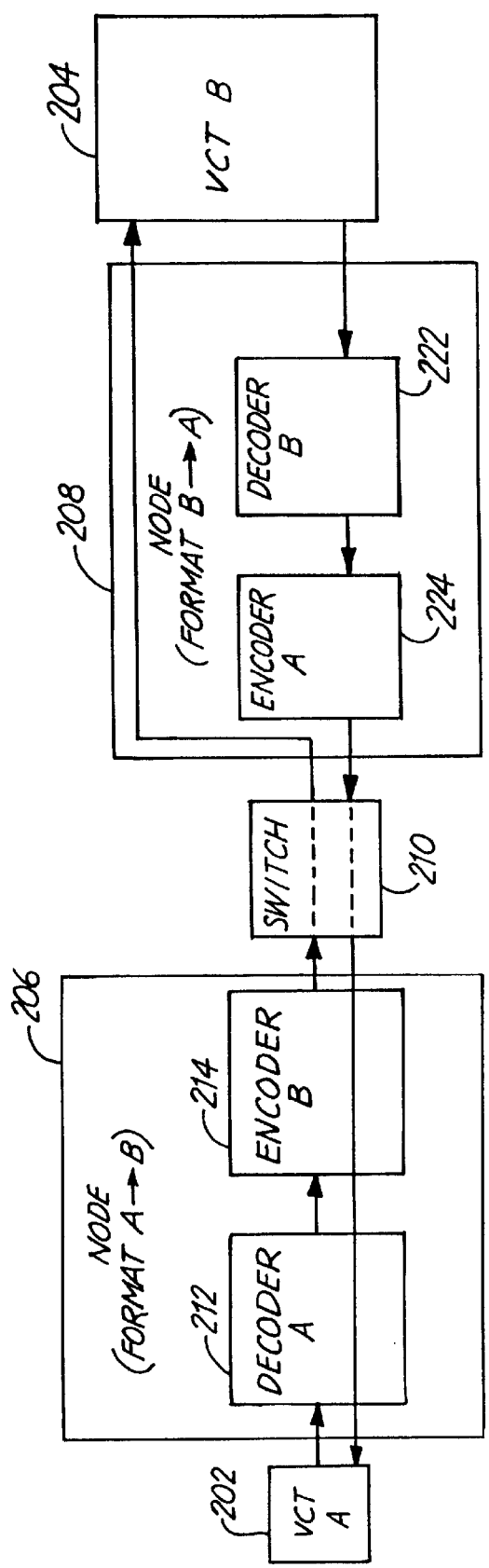
FIG. 2 is a functional block diagram of an example embodiment of two translator nodes coupled to a switch according to the present invention.

FIG. 2 is a functional block diagram of an example embodiment of two translator nodes coupled to a switch according to the present invention. The embodiment of FIG. 2 includes terminals 202 and 204, along with translator nodes 206 and 208. Nodes 206 and 208 are coupled to switch 210. Note that switch 210 symbolizes an individual one of example data switches 108, 110, or 112, or a combination of such data switches. In the example embodiment, terminal 202 is compatible with encoded video data of format A, and terminal 204 is compatible with encoded video data of format B.

Translator nodes 204 and 206 operate to receive as input from a video conferencing terminal encoded video data of a first format, translate the input encoded video data to a second format, and output the encoded video data of the second format. In the example, translator node 206 translates encoded video data from format A to format B and translator node 208 translates encoded video data from format B to format A.

Translator node 206 includes decoder 212 and encoder 214. Decoder 212 is coupled to receive output from terminal 202, and encoder 214 is coupled to receive output from decoder 212 and provide encoder output to switch 210. In an example embodiment, decoder 212 and encoder 214 are configurable to process various formats. For example, nodes 206 and 208 can be implemented using any of a variety of processor arrangements, including the arrangements disclosed in U.S. patent application Ser. Nos. 08/692,993 and 08/658,917, respectively entitled and relating to issued patents also entitled "Programmable Architecture and Methods for Motion Estimation" (U.S. Pat. No. 5,594,813) and "Video Compression and Decompression Processing and Processors" (U.S. Pat. No. 5,379,351). These applications and issued patents are incorporated herein by reference. Such processor arrangements can be selectively loaded with program code for decoding and encoding video data of various formats. In yet another embodiment, nodes 206 and 208 may be implemented with ASICs.

In the example illustrated in FIG. 2, decoder 212 is configured to decode encoded video data of format A that are received from terminal 202. The decoded video data output from decoder 212 are input to encoder 214. Encoder 214 is configured to encode input video data into format B. Node 208 similarly includes a decoder 222 for decoding encoded video data of format B from terminal 204 and an encoder 224 for encoding video data into format A. Note that each of translator nodes 206 and 208 provides encoded video data received via switch 210 to the respective terminal 202 or 204 without any additional encoding or decoding.

Switch 210 operates to direct input and output data between nodes 206 and 208, as well as configure nodes 206 and 208 to perform the necessary decoding and encoding. Switch 210 may use various mechanisms for identifying the proper format of encoded video data for a video conferencing terminal. For example, a connection request from a video conferencing terminal may include a caller-ID that identifies the calling device. Switch 202 may maintain a database of telephone numbers and associated formats for encoded video data. In the example shown, the telephone number of video conferencing terminal 202 is associated with format A. In another embodiment, a request from a video conferencing terminal may include a header that indicates the expected format of encoded video data.

As indicated above, switch 210 along with translator nodes 206 and 208 may comprise a computer system. In such a system, nodes 206 and 208 may be special purpose processor arrangements coupled to such computer systems bus. Furthermore, nodes 206 and 208 may have their conversion capabilities programmed by the computer system. In another embodiment, converter nodes 204 and 206 may include special purpose hardware for performing such conversions.

Figure 3A:
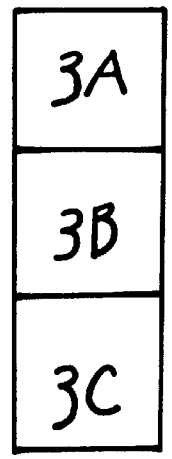
Figure 3A:
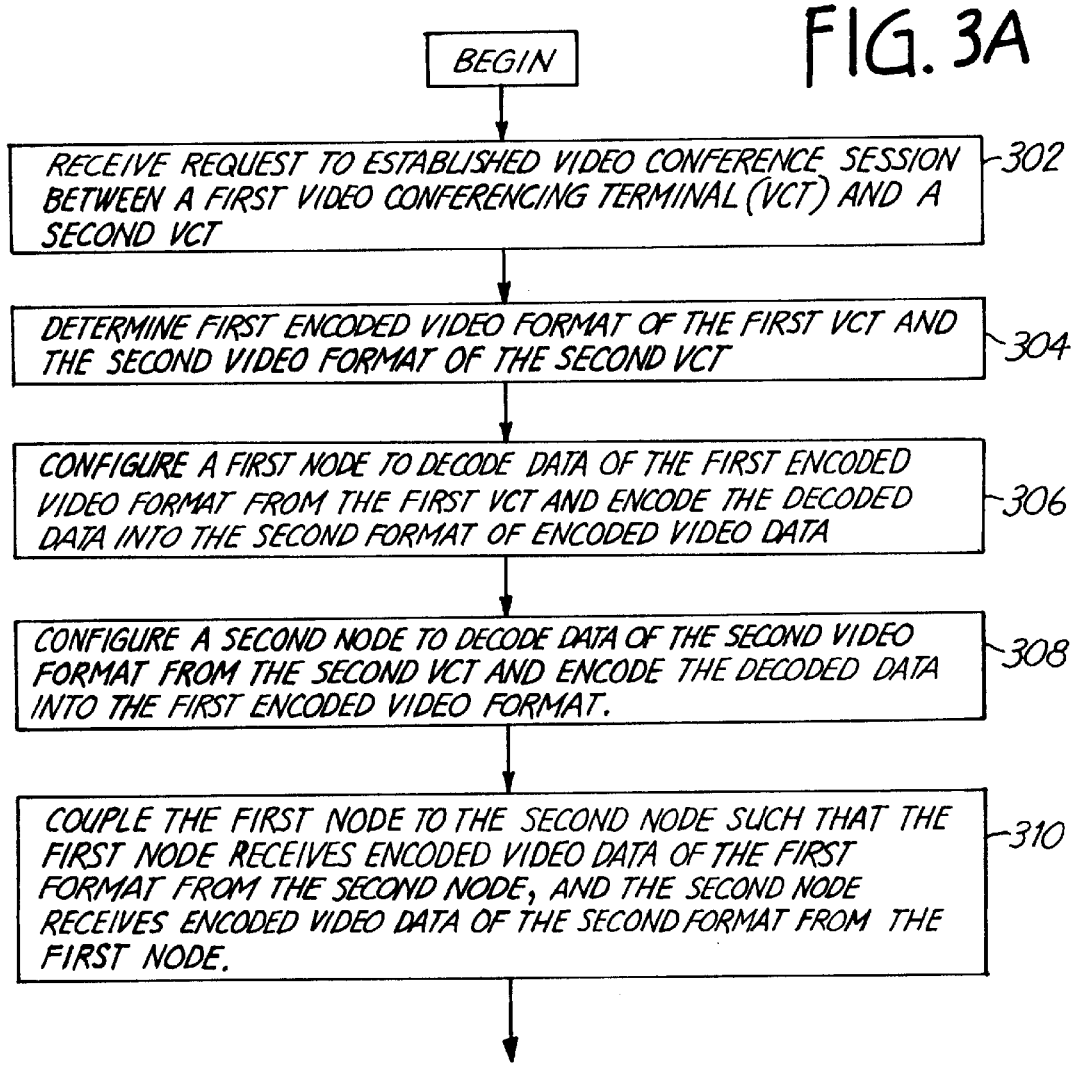
Figure 3B:
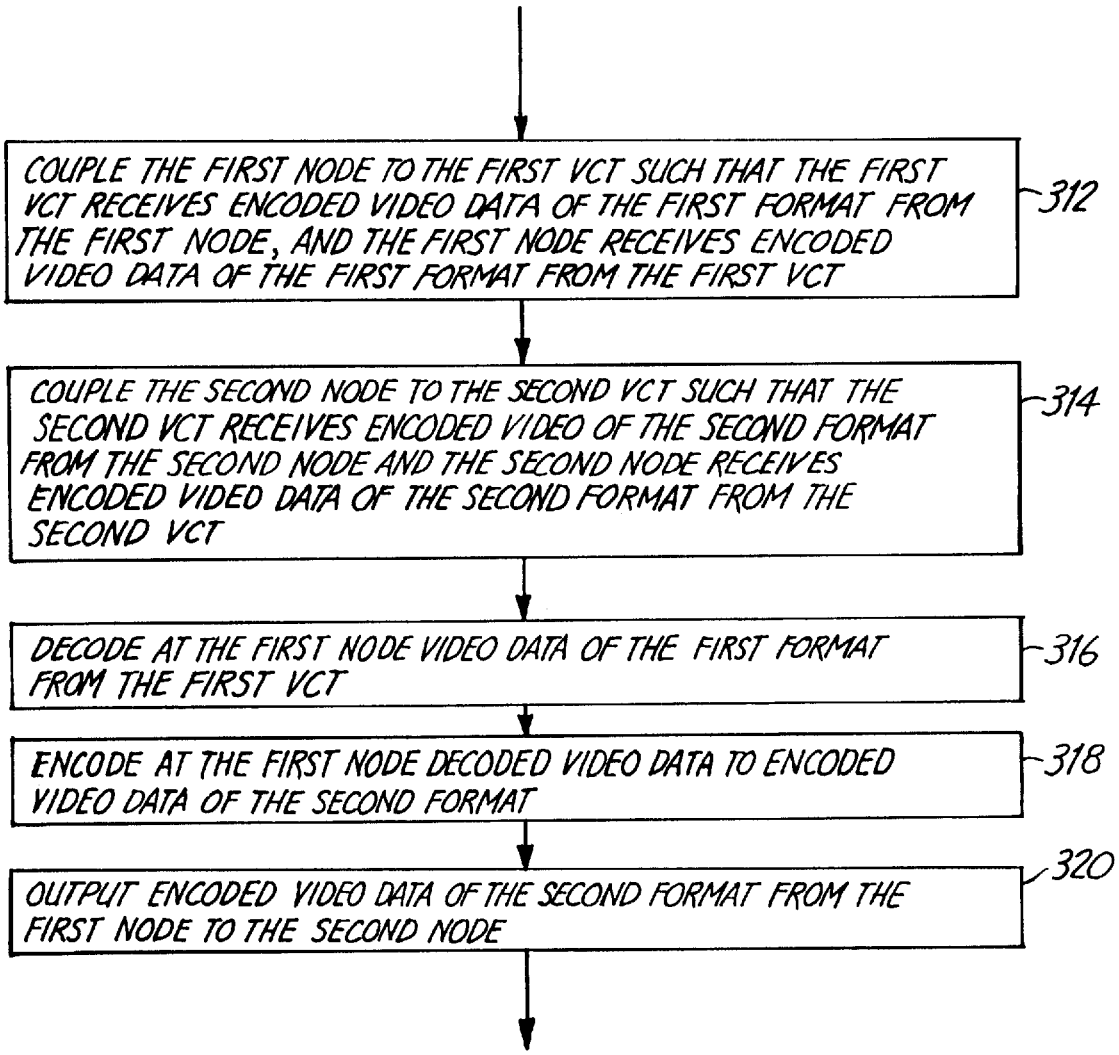

FIGS. 3A, 3B, and 3C contain a flowchart of an example method operating in accordance with the present invention.

At processing block 302, an example switch receives a request to establish a video conference session between a first video conference terminal and a second video conference terminal. The switch then determines the expected format of encoded video data for each of the first and second video conferencing terminals, as shown by processing block 304. Processing continues at block 306 where the switch configures a first node to the decode video data of the first format from the first video conferencing terminal and encode the video data into the second format. Continuing with processing block 308, the switch also configures a second node to decode video data of the second format from the second terminal and encode the video data into the first format. Thus, after processing block 308, two translator nodes are established, one for translating from format A to format B and a second for translating from format B to format A.

At processing block 310, the first node and the second node are coupled such that the first node receives encoded video data of the first format from the second node, and the second node receives encoded video data of the second format from the first node. The coupling is illustrated in the example embodiment of FIG. 2, wherein switch 210 includes dashed lines that symbolize the coupling.

Continuing at processing block 312, the first node is coupled to the first video conferencing terminal. In coupling the first node to the first video conferencing terminal, the first video conferencing terminal receives encoded video data of the first format from the first node, and the first node receives encoded video data of the first format from the first video conferencing terminal. Similarly, at processing block 314, the second node is coupled to the second video conferencing terminal. Thus, the second video conferencing terminal receives encoded video data of the second format from the second node, and the second node receives encoded video data of the second format from the second video conferencing terminal. Processing blocks 302–314 illustrate the example processing involved in establishing communications between video conferencing terminals that are compatible with different formats of encoded video data Processing blocks 316–330 illustrate example processing involved in providing communications between two video conferencing terminals, each compatible with a different format of encoded video data Continuing now at processing block 316, the first node decodes encoded video data of the first format that is received from the first video conferencing terminal, and at processing block 318, the first node encodes the decoded video data to encoded video data of the second format. At block 320, encoded video data of the second format from the first node is provided to the second node via the switch. The second node, in response to encoded video data of the second format received from the first node, outputs the encoded video data to the second video conferencing terminal, as shown by processing block 322.

The second node, in response to encoded video data of the second format from the second video conferencing terminal, decodes the encoded video data of the second format, as shown at processing block 324. The decoded video data is then encoded into video data of the first format by the second node as shown by processing block 326. At processing block 328, encoded video data of the first format that is output from the second node is provided to the first node via the switch. The first node, in response to encoded video data of the first format input via the switch, outputs the encoded video data of the first format to the first video conferencing terminal, as shown at processing block 330.

The various embodiment described above are provided by way of illustration only and should not be construed to limit the invention. Those skilled in the art will readily recognize various modifications and changes that may be made to the present invention without strictly following the example embodiment and application illustrated and described herein, and without departing from the true spirit and scope of the present invention, which is set forth in the following claims.

What is claimed is:

1. A system for communicating signals including video signals, the system comprising:
    a first video station including a first translator and a user-communicative first video terminal, the first video terminal compatible with a first format of encoded video data; and
    a second video station including a second translator, the second video station compatible with a second format of encoded video data;
    wherein encoded video data is passed between the first video terminal and the second video station, wherein the first translator is configured and arranged for performing operations (a)–(c);
        (a) decoding encoded video data of the first format from the first video terminal;
        (b) encoding in the second format video data from the decoding operation (a);
        and
        (c) transmitting video data of the second format provided by the encoding operation (b) for processing by the second video station; and wherein the second translator is configured and arranged for performing operations (d)–(f);
        (d) decoding encoded video data of the second format;
        (e) encoding in the first format video data from the decoding operation (d); and
        (f) transmitting video data of the first format provided by the encoding operation (e) for processing by the first video station;
    the first video station being configured and arranged for providing the video data video data of the first format received from the second translator to the user-communicative first video terminal.

2. The system of claim 1 wherein each of the first and second formats is a distinct industry-accepted video communications format.

* * * * *

UNITED STATES PATENT AND TRADEMARK OFFICE
CERTIFICATE OF CORRECTION

PATENT NO. : 6,373,517 B1 Page 1 of 1
DATED : April 16, 2002
INVENTOR(S) : Davis et al.

It is certified that error appears in the above-identified patent and that said Letters Patent is hereby corrected as shown below:

Drawings,
Fig. 3A, 302, "Established" should read -- Establish --.

Column 3,
Line 47, "used run" should read -- used to run --.

Column 6,
Line 10, "embodiment" should read -- embodiments --.

Signed and Sealed this

Fourth Day of May, 2004

JON W. DUDAS
*Acting Director of the United States Patent and Trademark Office*